US009050755B2

(12) United States Patent
Herod et al.

(10) Patent No.: US 9,050,755 B2
(45) Date of Patent: Jun. 9, 2015

(54) PROCESS FOR PRODUCING A CURVED SUBSTRATE COVERED WITH A FILM

(71) Applicant: Essilor International (Compagnie Generale D'Optique), Charenton Le Pont (FR)

(72) Inventors: Timothy E. Herod, St. Petersburg, FL (US); Margie Hendrickson, St. Petersburg, FL (US); Robert J. Rist, St. Petersburg, FL (US)

(73) Assignee: Essilor International (Compagnie Generale D'Optique), Charenton Le Pont (FR)

( * ) Notice: Subject to any disclaimer, the term of this patent is extended or adjusted under 35 U.S.C. 154(b) by 233 days.

(21) Appl. No.: 13/657,454

(22) Filed: Oct. 22, 2012

(65) Prior Publication Data

US 2013/0105080 A1      May 2, 2013

Related U.S. Application Data

(63) Continuation of application No. 13/514,026, filed as application No. PCT/US2009/067820 on Dec. 14, 2009, now abandoned.

(51) Int. Cl.
| | |
|---|---|
| *C09J 5/02* | (2006.01) |
| *B29C 65/48* | (2006.01) |
| *B29C 65/00* | (2006.01) |
| *B29D 11/00* | (2006.01) |
| *B29L 11/00* | (2006.01) |

(52) U.S. Cl.
CPC .............. *B29C 65/48* (2013.01); *B29C 66/0242* (2013.01); *B29D 11/00644* (2013.01); *B29D 11/0073* (2013.01); *B29C 66/1122* (2013.01); *B29C 66/343* (2013.01); *B29C 66/532* (2013.01); *B29L 2011/0016* (2013.01); *B29C 66/452* (2013.01); *B29C 66/5326* (2013.01); *B29C 66/71* (2013.01); *B29C 65/4825* (2013.01); *B29C 65/483* (2013.01)

(58) Field of Classification Search
CPC ............... B29C 63/0073; B29D 11/00; B29D 11/00009; B32B 38/1866
USPC ........................................... 156/99, 196, 322
See application file for complete search history.

(56) References Cited

U.S. PATENT DOCUMENTS

| | | | |
|---|---|---|---|
| 5,045,397 A * | 9/1991 | Jensen ........................... 428/429 |
| 7,581,832 B2 | 9/2009 | Begon et al. | |
| 8,262,843 B2 * | 9/2012 | Fayolle .......................... 156/322 |
| 8,628,634 B2 * | 1/2014 | Marty et al. ................... 156/212 |
| 2009/0165932 A1 | 7/2009 | Biteau et al. | |

FOREIGN PATENT DOCUMENTS

WO       WO 2007144308 A1 *  12/2007  .............. B29C 63/00

* cited by examiner

*Primary Examiner* — Scott W Dodds
(74) *Attorney, Agent, or Firm* — Seed IP Law Group PLLC

(57) ABSTRACT

A process for producing a curved substrate (20) covered with a film (10) comprises a heat treatment of the film performed between a step of preforming said film and a step of assembling the film with the substrate. A maximum temperature of the pre-assembling heat treatment is higher than another maximum temperature of a post-assembling heat treatment (F) which is performed after the assembling step. Then the assembly of the substrate (20) with the film (10) is not altered during said post-assembling heat treatment. In particular, no defect and no delamination appear, and no change in the curved shape of the substrate is caused by the post-assembling heat treatment, even if the substrate (20) has a low glass transition temperature.

11 Claims, 1 Drawing Sheet

PROCESS FOR PRODUCING A CURVED SUBSTRATE COVERED WITH A FILM

Figure 1A:

The present invention relates to a process for producing a curved substrate covered with a film.

The manufacturing of many products requires applying a film onto a substrate, for providing the substrate with at least one additional function or a new aesthetic appearance. But difficulties often arise when the substrate surface which is intended to be covered with the film, also called receiving surface of the substrate, is curved. In this specification, curved surface means generally a continuous surface, without steps and ridges therein so that two curvature values exist at any point of the surface. These curvature values may vary between points located apart from one another in the surface. They may also be equal along two perpendicular directions crossing at one and same point of the surface. Such surfaces are also called pseudo-spherical surfaces.

But the films are often supplied initially with a planar shape, which can be changed to cylindrical shapes when these films are resilient. Indeed, such shapes make it possible to wound the films in roll form, which is very convenient for stocking, transportation and even loading into transformation units. But unless such films are very elastic or plastic, they cannot be applied on surfaces with non-zero curvatures along two directions without producing ripples, shrinks, stretches, cracks and even tears. Such defects cannot be accepted for many products, in particular when optical quality requirements are to be met. This is so in particular for ophthalmic applications, where defects possibly present at the surface of an eyeglass can produce light-diffusion and irisation when they are small enough, or may impinge on clear see-through for the eyeglass user.

Because of this problem, one often preforms the film before it is applied on the receiving surface. Thus, the film is first provided with a curved shape, with curvature magnitudes which are closer to those of the receiving surface than the initial planar shape. Well-known preforming processes are hot pressing and hot embossing, where the film is heated and forced to conform to one or more curved reference surfaces.

So known processes for producing a curved substrate covered with a film usually comprise the following successive steps:
/1/ providing the substrate with the curved receiving surface;
/2/ preforming the film so as to provide it with a curved shape;
/4/ assembling the film with the substrate by applying the film on the substrate receiving surface, with permanent connecting means arranged therebetween; and
/5/ heating the substrate assembled with the film up to a post-assembling temperature.

Step /5/ may be implemented for various purposes, including without limitation curing of the connecting means, further deposition of at least one coating onto the substrate or the film, further processing steps performed with the substrate assembled with the film, and any temperature exposure which may occur during the lifetime of the product.

But the preforming process implemented in step /2/ generates permanent stresses within the film, which may produce defects that can appear later after a varying time period. For example such defects may be delaminations between the film and the substrate, which can occur after the quality controls during the lifetime of the product. Such delaminations consist in local separations or pulling away of the film from the substrate, where separation forces become higher than the cohesion or adhesion strength of the connecting means which are used for retaining the film onto the substrate. In particular, such defects may appear during the heat treatment of step /5/.

Another problem arises when the substrate has a young modulus value at the maximum temperature reached in step /5/ which is lower than that of the film for the same temperature. In such situation, the stresses in the film, and in particular those stresses generated during the preforming step /2/, cause the shape of the receiving surface of the substrate to change in the assembly. Then, the final shape of the receiving surface with the film is not controlled, and becomes out of the specification for the final product. This behaviour occurs in particular when the substrate is based on a plastic material with a low glass transition temperature, and when the maximum temperature of the heat treatment carried out in step /5/ is higher than this glass transition temperature. It is dramatic for optical and ophthalmic applications, causing important production reject because the optical function of the product results from the final shape of the substrate receiving surface.

Then, an object of the present invention is to produce a curved substrate with a film thereon, without defects and without the shape of the substrate receiving surface being altered in the final product.

According to the invention, in a process with the steps recited above, the curvature which is provided to the film at step /2/ is higher than the curvature of the substrate receiving surface. In addition, the process further comprises a step /3/ intermediate between steps /2/ and /4/, with this step /3/ comprising the following substeps:
/3-a/ heating the film up to a pre-assembling temperature with a progressive temperature increase over at least 30 minutes between 50° C. and the pre-assembling temperature, this pre-assembling temperature being higher than the post-assembling temperature of step /5/; and
/3-b/ maintaining the film at or above the pre-assembling temperature during at least one hour.

Such pre-assembling heat treatment reduces the stresses present in the film after step /2/, so that the defects which would appear otherwise during of after the heating of step /5/ are suppressed.

It also avoids that the film causes a change in the shape of the substrate receiving surface, in particular when the substrate material has a glass transition temperature lower than the post-assembling temperature of the heat treatment carried out in step /5/.

It is important that the maximum temperature of the pre-assembling heat treatment of step /3/, so-called pre-assembling temperature, be higher than that of the post-assembling heat treatment of step /5/, called post-assembling temperature. This ensures in particular that no stress remains within the film, which could be sufficient for producing defects or variations in the shape of the substrate receiving surface during step /5/.

Then, the invention allows using a substrate based on a plastic material, with a glass transition temperature that is lower than 100° C., possibly between 75° C. and 85° C.

In possible implementations of the invention, the film may comprise a multilayered structure including a polyvinyl alcohol-based layer and two triacetyl cellulose-based layers which are arranged on opposite sides of the polyvinyl alcohol-based layer. Then, the pre-assembling temperature is higher than or equal to 105° C.

In various implementations of the invention, the following improvements may be used, individually or some of them being combined with one another:
the curvature which is provided to the film at step /2/ may be higher than the curvature of the substrate receiving surface as provided in step /1/ with a curvature difference of more than 0.5 diopter;

the film may be provided with the curved shape in step /2/ by thermoforming;

the progressive temperature increase of substep /3-a/ may be a linear ramping over time;

the film may be maintained at or above the pre-assembling temperature in substep /3-b/ during at least two hours; and step /5/ may pertain to providing a coating onto the substrate assembled with the film, or to processing a coating provided on the substrate assembled with the film.

For implementations in the field of optics, the substrate may be a lens or a semi-finished lens, and the film may be transparent for clear see-through. The invention is then particularly advantageous, because the defects that would occur without performing step /3/ are visible, and variations in the shape of the receiving surface would lead to discarding an important number of final product units.

For implementations in the field of ophthalmics, the substrate may be an ophthalmic lens or a semi-finished ophthalmic lens, with the film being transparent again. The invention then reduces or suppresses optical and aesthetic defects which are excluded by the ophthalmic quality requirements.

In particular, the film may be a light-polarizing film for the optical or ophthalmic applications.

Figure 1B:

Other features and advantages of the invention will appear in the following detailed description which is provided as a non limiting illustration of the invention, referring to the figures appended hereto and now listed:

FIGS. 1a and 1b are respective cross-sectional views of a film and a substrate which may be used for implementing the invention; and FIGS. 2a to 2d illustrate successive steps of a process according to the invention.

For illustration purpose, the implementations of the invention now described pertain to the field of ophthalmics, for producing a spectacle eyeglass covered with light-polarizing film. The film 10 is then a multilayered transparent structure as shown in FIG. 1a. It includes a polyvinyl alcohol- or PVA-based layer 1, which is layered between two triacetyl cellulose- or TAC-based layers 2 and 3. The layers 2 and 3 provide appropriate chemical and physical protection to the layer 1. They may be each about 10 μm (micrometer) thick. The layer 1 may be about 100 μm thick. It also includes dichroic species, which are light-absorbing for radiations with a predetermined polarization direction. Such film 10 is well-known and may be supplied commercially. It is supplied initially in the form of planar sheets, or in the form of strips which are wound in roll form. In this latter case, the strips can be unwound so that their initial shape is made planar.

The substrate 20 is a spectacle eyeglass substrate, which may be itself a finished or a semi-finished eyeglass. It is provided with two curved optical surfaces as shown in FIG. 1b: a first convex surface $S_1$ intended to be oriented opposite to the eye of a wearer of the spectacles, and a concave surface $S_2$ intended to be oriented towards the wearer's eye. Each one of the surfaces $S_1$ and $S_2$ may be spherical, toric or complex, i.e. with curvatures along two perpendicular directions which vary over this surface. Possibly, the surfaces $S_1$ and $S_2$ may be progressive or regressive surfaces. In a known manner, these curvatures produce values for ophthalmic parameters which are suitable for correcting an ametropia of the wearer.

For the sake of illustration, the film 10 is intended to be assembled with the substrate 20 on the convex surface $S_1$. Then this surface $S_1$ is called receiving surface.

The substrate 20 may be of any transparent material currently used in ophthalmics. In particular, this material may have a low glass transition temperature, less than 100° C. For example, the constituting material of the substrate 20 may be that designated commercially by 1.67 MR7®. Then, the glass transition temperature of the substrate 20 is comprised between 75° C. and 85° C., leading to Young modulus values of about 20 MPa (megapascal) at 100° C.

The film 10 has a Young modulus value of about 30 GPa (gigapascal) at about 100° C. Then, if the film 10 is initially different in shape—i.e. different in curvature values—from the receiving surface $S_1$ and is directly forced to conform to the surface $S_1$ when being glued on this latter, this will produce stresses within the film 10. Then, upon heating of the assembly of the 1.67 MR7® substrate 20 with the film 10 up to 100° C., these stresses will cause both the film 10 and the receiving surface $S_1$ to vary in shape. Then, the ophthalmic values of the eyeglass, namely its spherical power and astigmatism, are altered in an uncontrolled manner.

Another possibility is that the material of the substrate 20 has a high value for the Young modulus at about 100° C., of the order of that of the film 10 or higher than this latter. For example polyamide and polycarbonate are such plastic materials for the substrate 20 with glass transition temperatures higher than 100° C. The film 10 will conform again to the shape of the receiving surface $S_1$ upon being assembled with the substrate 20, and the shape of the receiving surface $S_1$ will not change upon heating the assembly at about 100° C. But the stresses in the film 10 may cause the connection means between the film and the substrate to break locally, resulting in delaminations or failure of the connecting means. Also possible is local defects to appear in the film 10, such as cracks, shrinks, etc. These delaminations or defects may appear during a heat treatment performed after the assembling of the substrate 20 with the film 10, or later during the lifetime of the final eyeglass.

Figure 2A:
Figure 2B:

With reference to FIGS. 2a-2d, the film 10 is first preformed. Such preforming may be performed using any known process, in particular a thermoforming process. FIG. 2a shows that the film 10 is thus provided with a curvature which is higher than that of the substrate receiving surface $S_1$ represented in broken line. In a known manner, higher curvature for the film 10 means that curvature radii of the film 10 are generally smaller than those of the surface $S_1$. Reference $10_{/2/}$ denotes the film 10 with the curved shape as resulting from this preforming step. Here, curvatures and curvature radii are considered in absolute values for comparisons. At this time, the curvature difference between the film 10 and the receiving surface $S_1$ is preferably at least 0.5 diopter. For example, the curvature of the receiving surface $S_1$ may be about 5.33 diopters, and that of the film 10 at room temperature of about 30° C., corresponding to reference $10_{/2/}$, may be about 6.26 diopters.

Then the film 10 is processed with the heat treatment introduced by the invention. For example, this treatment may consist in a linear temperature ramping from about 50° C. to about 105° C. over one hour, and then a time period of at least three hours for maintaining the film 10 at constant temperature of 105° C. Then the film 10 is cooled back to room temperature. This heat treatment may cause some stresses present in the film 10 after the preforming step to relax, and the film 10 to exhibit a shape memory behaviour. Thus, the curvature of the film 10 at the end of the heat treatment, which curvature is denoted $10_{/3/}$ in FIG. 2b, may be intermediate between the initial planar shape of FIG. 1a and the curvature just after the preforming step, corresponding to $10_{/2/}$. Actually, the curvature of the film 10 has thus become closer to that of the receiving surface $S_1$ of the substrate 20. For example, the curvature of the film 10 after the pre-assembling heat treatment may be about 5.61 diopters.

Figure 2C:
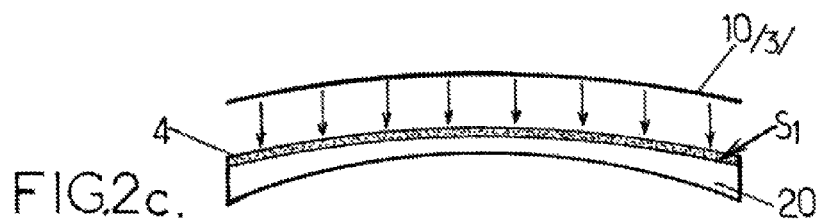

A layer 4 of an adhesive material is then arranged on the receiving surface $S_1$ of the substrate 20 or on the surface of the film 10 which is to be oriented towards the surface $S_1$ in the final assembly of the film and the substrate. This adhesive material may be a pressure-sensitive adhesive, or PSA. Alternatively, a curable glue may be used for the adhesive material of the layer 4. The film 10 is then applied against the receiving surface $S_1$, as illustrated by FIG. 2c. At this time, the shape of the film 10 conforms to that of the surface $S_1$, because the substrate 20 is less resilient than the film 10. But because the film curvature corresponding to $10_{/3/}$ introduced just above is close to the curvature of the surface $S_1$, few stresses are generated within the film 10 during this application step.

Figure 2D:
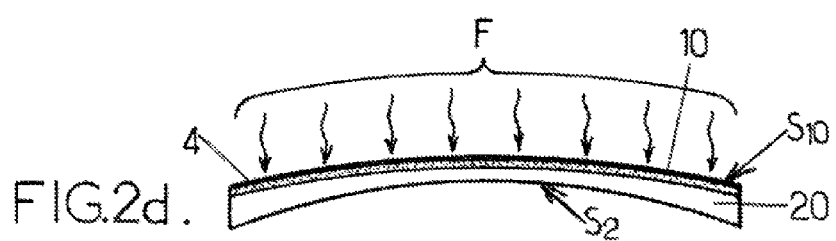

The assembly comprising the film 10 and the substrate 20 is further heat treated as illustrated by FIG. 2d. This additional heat treatment is called post-assembling heat treatment. F denotes the heat flux used. For example, the assembly of the film 10 and the substrate 20 is heated at about 100° C. during three hours. This post-assembling heat treatment may be useful for various purposes. When a glue is used for the layer 4, a curing treatment of this glue may be necessary for producing a permanent connection between the film 10 and the substrate 20. Alternatively, the post-assembling heat treatment may be useful for depositing at least one functional coating on the substrate surface $S_2$ and/or on the surface $S_{10}$ of the film 10 which is oriented away from the substrate 20. According to the invention, the maximum temperature of this post-assembling heat treatment is lower than that of the pre-assembling heat treatment performed between the preforming of the film 10 and its application onto the substrate 20. Then, the film 10 does not produce further memory shape behaviour during the post-assembling heat treatment. So this post-assembling heat treatment does not generate itself significant stresses within the film 10, so that the adhesive layer 4 does not break and no defects appear in the film 10. For the 1.67 MR7® substrate 20, the curvature of the receiving surface $S_1$ covered with the film 10 is about 5.35 diopters after the post-assembling heat treatment and cooling back to room temperature.

A special benefit of the invention is that it is no longer necessary to control accurately the maximum temperature of the post-assembling heat treatment, provided it is less than the maximum temperature of the pre-assembling heat treatment. Thus the post-assembling heat treatment can be performed in various locations without strict control requirements, because there is no consequence on the values of the final eyeglass for the spherical power and the astigmatism.

Thanks to the invention, the assembly of the film 10 and the substrate 20 is stable, so that it is not altered even after a long period from the post-assembling heat treatment. In particular, the assembly cohesion remains strong, no defect appears and the curvature of the receiving surface $S_1$ does not change.

It is clear that the implementation of the invention just described may be adapted and modified with respect to numerous aspects. In particular, the variations now listed may be implemented:

- the curvature values may be varied;
- the constituting material for the substrate 20 may be varied;
- the TAC films 2 and 3 may be replaced with butylacetate cellulose- or BAC-based films, or polyester- or PET-based films;
- the PVA-based film 1 may be replaced with a polyvinylene-based film;
- the film 10 may provide a tinting or photochromic function instead of the polarizing function;
- the film 10 may be provided with an antireflective coating and/or a scratch-resistance coating;
- the connecting means may be varied; and
- the post-assembling heat treatment may pertain to a processing of the tinting or photochromic film 10 or a processing of the scratch-resistance coating, so as to make efficient the function of the film and/or the coating.

The invention claimed is:

1. A process for producing a curved substrate covered with a film, comprising:
   providing the substrate with a curved receiving surface;
   preforming the film so as to provide said film with a curved shape having a curvature that is higher than a curvature of the substrate receiving surface;
   heating the curved film up to a pre-assembling temperature with a progressive temperature increase over at least 30 minutes between 50° C. and the pre-assembling temperature; and
   maintaining the film at or above the pre-assembling temperature for at least one hour;
   assembling the film with the substrate by applying said film on the substrate receiving surface, with adhesive arranged between said film and said substrate; and
   heating the substrate assembled with the film up to a post-assembling temperature that is lower than the pre-assembling temperature, wherein the preforming includes thermoforming the film.

2. A process according to claim 1, wherein the substrate is based on a plastic material with a glass transition temperature lower than 100° C.

3. A process according to claim 2, wherein the glass transition temperature of the plastic material is between 75° C. and 85° C.

4. A process according to claim 1, wherein the film comprises a multilayered structure including a polyvinyl alcohol-based layer and two triacetyl cellulose-based layers arranged on opposite sides of the polyvinyl alcohol-based layer, and the pre-assembling temperature is higher than or equal to 105° C.

5. A process according to claim 1, wherein the curvature provided to the film in the preforming step is higher than the curvature of the substrate receiving surface with a curvature difference of more than 0.5 diopter.

6. A process according to claim 1, wherein the progressive temperature increase is a linear ramping over time.

7. A process according to claim 1, wherein the maintaining includes maintaining the film at or above the pre-assembling temperature during at least two hours.

8. A process according to claim 1, wherein heating the substrate assembled with the film up to a post-assembling temperature includes providing a coating onto the substrate assembled with the film or processing a coating provided on the substrate assembled with the film.

9. A process according to claim 1, wherein the substrate is a lens or a semi-finished lens, and wherein the film is transparent.

10. A process according to claim 9, wherein the substrate is an ophthalmic lens or a semi-finished ophthalmic lens.

11. A process according to claim 9, wherein the film is a light-polarizing film.

* * * * *